(12) United States Patent
Haber et al.

(10) Patent No.: US 12,465,021 B2
(45) Date of Patent: Nov. 11, 2025

(54) RING-SHAPED HOUSING FOR RODENT EXERCISE BALL

(71) Applicant: Rolling Rodents, LLC, Winston-Salem, NC (US)

(72) Inventors: Adam Haber, Roslyn, NJ (US); Ethan Haber, Winston-Salem, NC (US); William Fiebel, Succasunna, NJ (US); Mark Dorsey, Darien, CT (US); Joohwi Rhi, Oradell, NJ (US); Mathieu Zastawny, Jersey City, NJ (US); Maya Kremien, Austin, TX (US)

(73) Assignee: ROLLING RODENTS, LLC, Roslyn, NY (US)

( * ) Notice: Subject to any disclaimer, the term of this patent is extended or adjusted under 35 U.S.C. 154(b) by 0 days.

(21) Appl. No.: 17/172,648

(22) Filed: Feb. 10, 2021

(65) Prior Publication Data

US 2022/0132805 A1    May 5, 2022

Related U.S. Application Data

(60) Provisional application No. 62/972,584, filed on Feb. 10, 2020.

(51) Int. Cl.
*A01K 15/02* (2006.01)
*F16M 11/12* (2006.01)

(52) U.S. Cl.
CPC ........... *A01K 15/027* (2013.01); *F16M 11/12* (2013.01)

(58) Field of Classification Search
CPC ...... A01K 15/027; A01K 15/00; F16M 11/12; A63B 2/10
See application file for complete search history.

(56) References Cited

U.S. PATENT DOCUMENTS

| | | | | |
|---|---|---|---|---|
| 3,785,347 A | * | 1/1974 | Dinnerstein | A01K 1/035 119/700 |
| 5,108,089 A | * | 4/1992 | Wilkinson | A63B 23/0458 482/52 |
| 5,360,363 A | * | 11/1994 | Levin | A63H 33/18 446/236 |
| 5,419,008 A | * | 5/1995 | West | B62D 55/28 16/25 |
| 5,897,417 A | * | 4/1999 | Grey | F16M 11/14 403/90 |

(Continued)

*Primary Examiner* — Joshua D Huson
*Assistant Examiner* — Shanna Danielle Glover
(74) *Attorney, Agent, or Firm* — CARTER, DELUCA & FARRELL LLP

(57) ABSTRACT

A rodent exercise system includes a rodent exercise ball having a cavity with an inner surface and an access door on an outer surface that is selectively openable for entry of a rodent. A ring-shaped housing defines a central aperture aligned along an aperture axis to rotatably support the ball so it rotates in response to movement of the rodent. The housing defines a first plane extending along its width and transverse to the aperture axis, and a second plane extending along its thickness and along the aperture axis. At least one leg is selectively attachable to the housing in a stored position, extending in the first plane, or in a standing position, extending in the second plane. In the standing position, first and second ends of the leg rest on a surface to support the housing in an upright orientation.

18 Claims, 5 Drawing Sheets

(56) References Cited

U.S. PATENT DOCUMENTS

| | | | | |
|---|---|---|---|---|
| 6,071,167 | A * | 6/2000 | Yang | A63H 33/005 |
| | | | | 446/236 |
| 2004/0048722 | A1* | 3/2004 | Epstein | G06F 3/011 |
| | | | | 482/54 |
| 2007/0068017 | A1* | 3/2007 | Tamura | A01K 15/025 |
| | | | | 33/227 |
| 2007/0227460 | A1* | 10/2007 | Lynch | A01K 1/0245 |
| | | | | 119/455 |
| 2011/0041775 | A1* | 2/2011 | Ussen | A01K 15/027 |
| | | | | 119/702 |
| 2013/0184131 | A1* | 7/2013 | Doyle | A63B 26/003 |
| | | | | 482/139 |
| 2019/0208739 | A1* | 7/2019 | Pozzi | A01K 29/005 |
| 2020/0305393 | A1* | 10/2020 | Ho | F16M 11/123 |

* cited by examiner

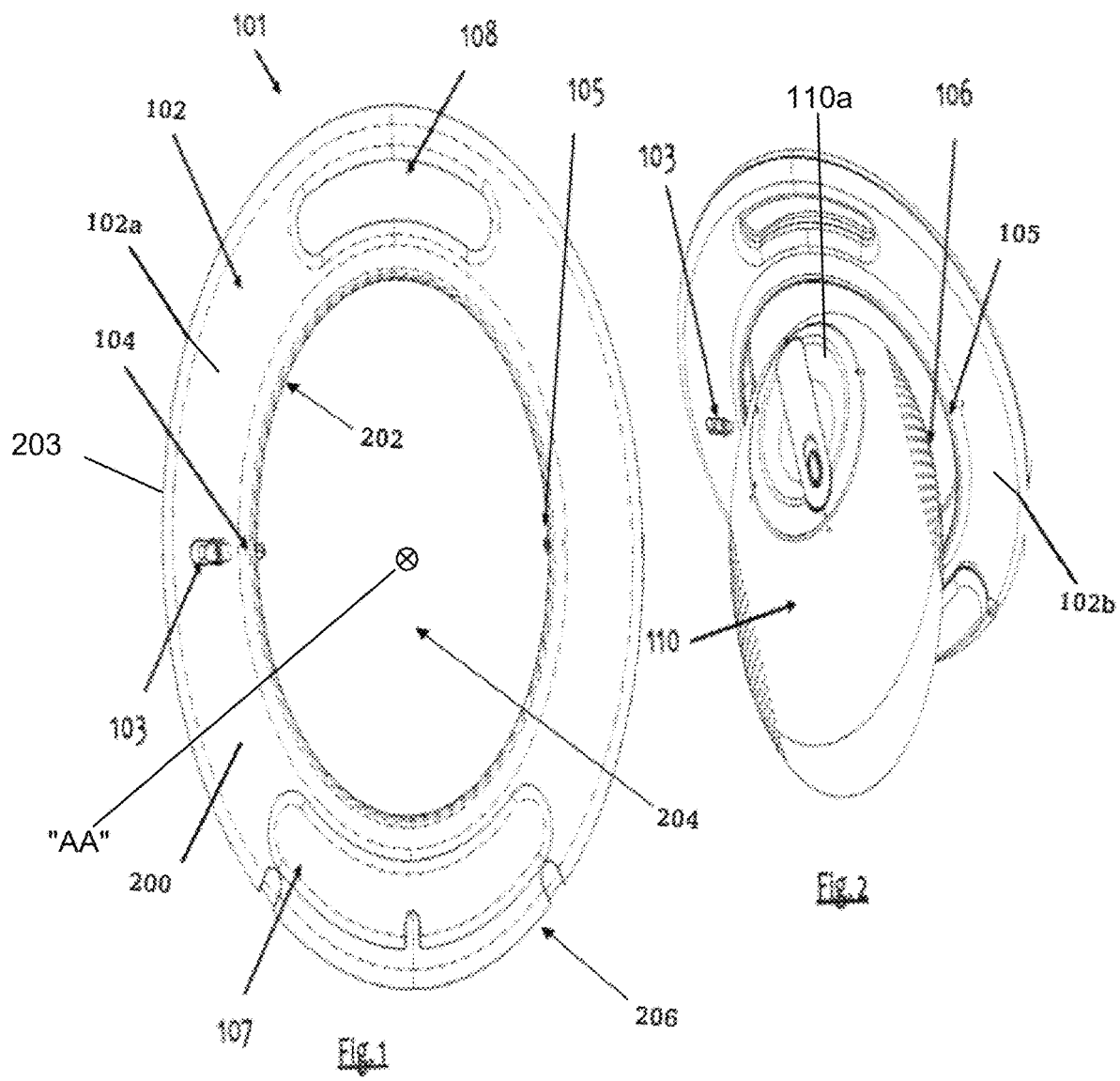

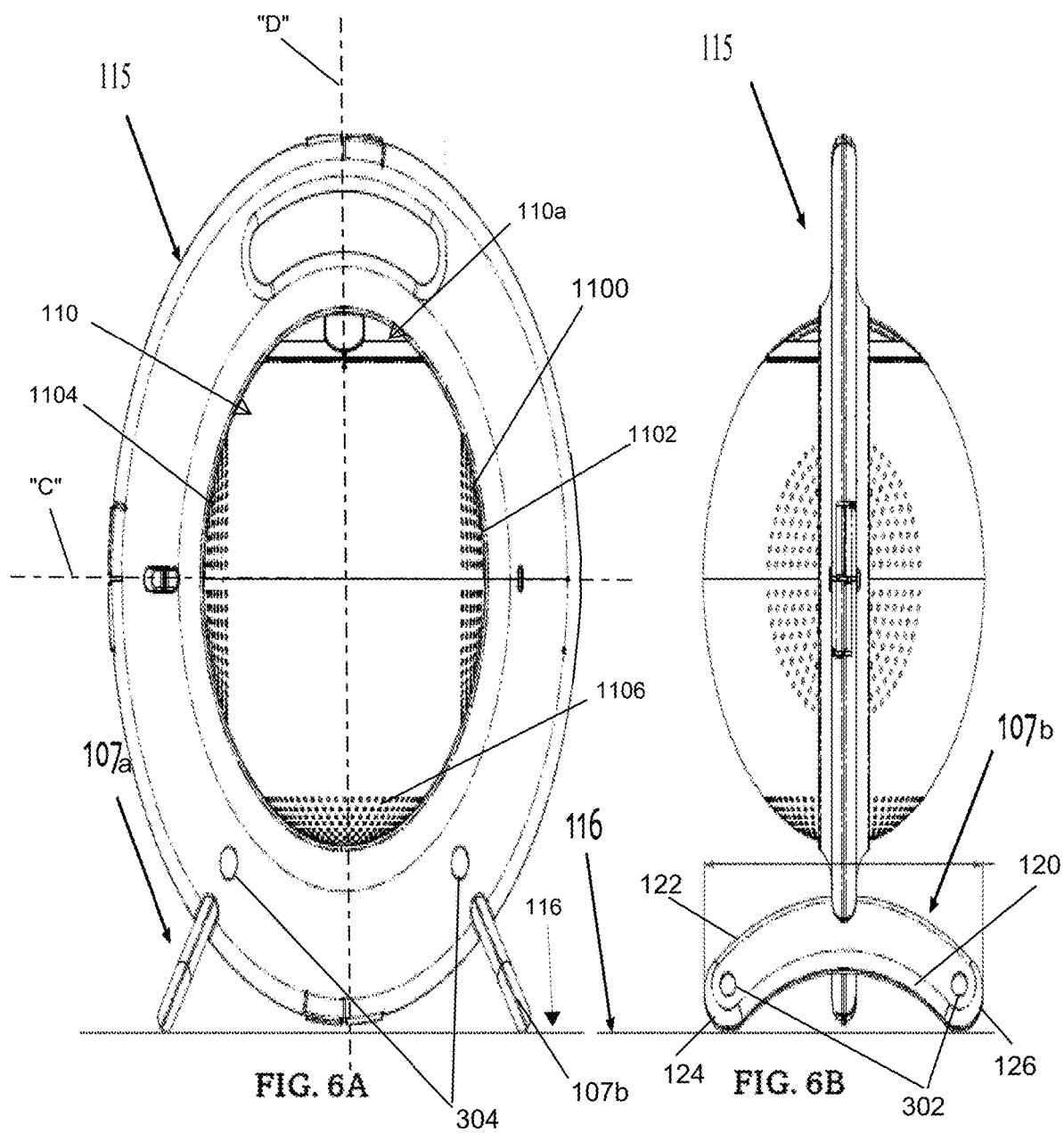

RING-SHAPED HOUSING FOR RODENT EXERCISE BALL

CROSS-REFERENCE TO RELATED APPLICATIONS

The present application claims the benefit of U.S. Provisional Patent Application No. 62/972,584, filed on Feb. 10, 2020, the entire contents of which are hereby incorporated by reference herein.

BACKGROUND

The current disclosure is directed to a carrier for exercise balls for rodents and other small animals that are kept as pets. When comes to cages and transport systems for hamsters and other small rodents, there are several options available that miniaturize the larger in-home pet environments and are designed to be more manageable on the go. Applicant believes that improvements can be made in terms of at least one of the types of novelty methods produced and the efficiencies gained for a carrier for a hamster ball. It is to at least one of these, or additional problems that the current disclosure is directed.

SUMMARY

By way of summary, the current disclosure is directed to a carrier for an exercise ball for rodents and other small animals that are kept as pets. This plastic carrier allows the carrying and setting up of stationary, 360 degree, or omnidirectional spin of the exercise ball within a compact ring form factor. The carrier is intended for recreational use in the home, in backyards, or in pet friendly parks. In one embodiment, the hamster ball attaches to the orbital ring through retractable inserts that allows the ball to rotate in only one direction. In yet another embodiment, the inner side of the ring is lined with ball bearings which allow the pet to spin freely at all times. When placed on the ground with the accompanying exercise ball affixed, the pet can experience 180 degrees of rotation along the circumference of the ring. Detachable legs allow for vertical stationary set up of the carrier. When placed on ground with the exercise ball attached and the accompanying leg attachments, the pet can experience omnidirectional spin. Hinges allows for easy insertion and removal of the exercise ball from the carrier.

In yet another embodiment, the carrier body consists of two parts that snap together to securely hold the exercise ball. It is novel in respect that no similar product exists on the market. The carrier shape is unique and iconic, similar to a "Saturn ring" with a handle cut-out. The shape is a very compact while allowing for the secure transportation of a sphere. A pet can run around freely in the accompanying exercise ball while being carried because the carrier uses ball bearings along inner side of the rings that allow ball to spin freely while in the carrier. The carrier can be propped up using detachable leg accessories, allowing pet to run freely while carrier is stationary. The detachable legs are stored inside ring when not in use. When carrier is placed on ground without leg attachments, rodent can spin 360 degrees along outer circumference of the ring.

Applicant believes that improvements have been made in terms of at least one of the types of novelty methods produced and the efficiencies gained for a hamster exercise ball carrier. It is to at least one of these, or additional problems that the current disclosure is directed.

Other examples will be set forth in more detail in the figures and detailed description below. The current disclosure is also directed to methods of adaptation and use. It will be apparent; however, that the detailed description is not intended to limit the present invention.

BRIEF DESCRIPTION OF THE DRAWINGS

The accompanying drawings form part of this specification and the invention will be better understood by a reading of the Detailed Description of the Examples of the Invention along with a review of said drawings wherein:

FIG. 1 is a top view of a rodent exercise apparatus carrier in accordance with the principles of the present disclosure;

FIG. 2 is a perspective view, with parts separated, of a rodent exercise system including the carrier of FIG. 1 and a rodent exercise apparatus;

FIGS. 6A and 6B are top and side views, respectively, of the rodent exercise system of FIG. 2 with the legs of the rodent exercise system shown attached to an outer edge of the carrier of the rodent exercise system.

DETAILED DESCRIPTION

Figure 3:
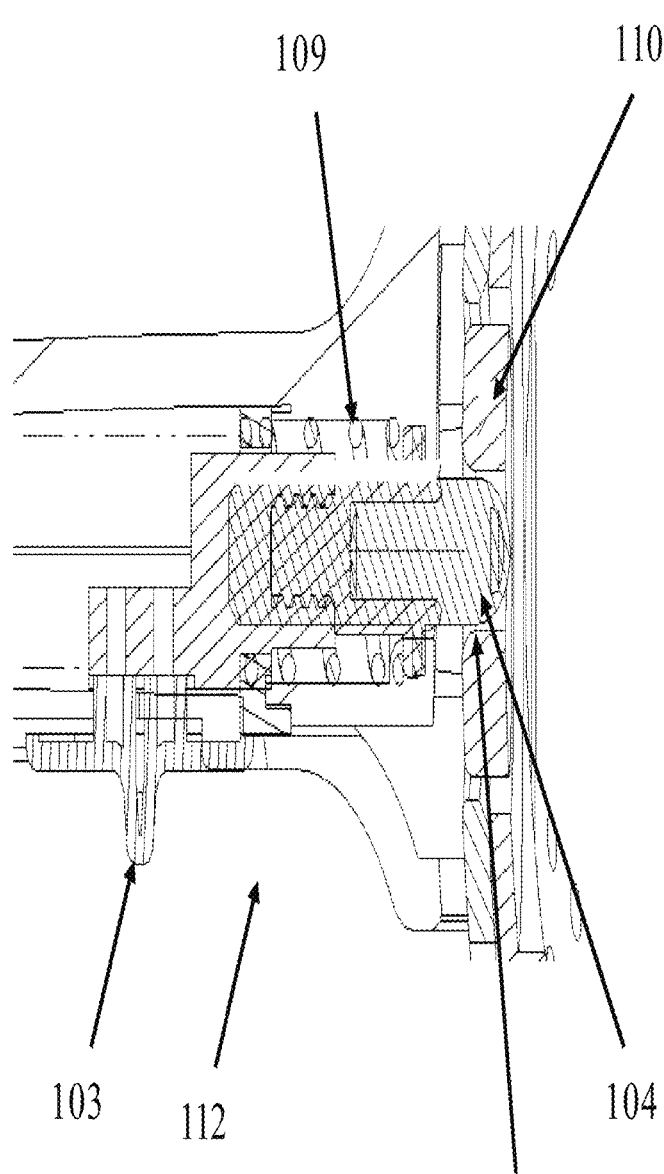
FIG. 3 is an enlarged, cross-sectional view of a portion of the carrier of FIG. 1 illustrating a retractable pin mechanism of the carrier.

FIGS. 1-4, 5A, 5B, 6A, 6B, 7A, and 7B illustrate a rodent exercise system including a carrier 101 designed to provide rodents structure for safe exercise, as well as safe and convenient travel. As shown in FIG. 1, the carrier 101 includes a ring-shaped housing 102 having a curvilinear body 200. The curvilinear body 200 has a first curvilinear face 200a and second curvilinear face 200b that is disposed opposite (e.g., mirrored relative to) the first curvilinear face 200a (see FIG. 5B). The ring-shaped housing 102 defines a length "L", a width "W", and a thickness "T" (see FIGS. 5A and 5B). The ring-shaped housing 102 also defines a first plane "P1" extending along the width of the ring-shaped housing 102 and a second plane "P2" that is transverse (e.g., orthogonal) to the first plane "P1" that extends along the thickness of the ring-shaped housing 102. The ring-shaped housing 102 has first and second curvilinear faces 102a, 102b (e.g., front and rear surfaces) on opposed sides of the thickness "T" of the ring-shaped housing 102. The carrier 101 also defines a first or handle aperture 108 (e.g., which forms a handle).

Figure 5A:
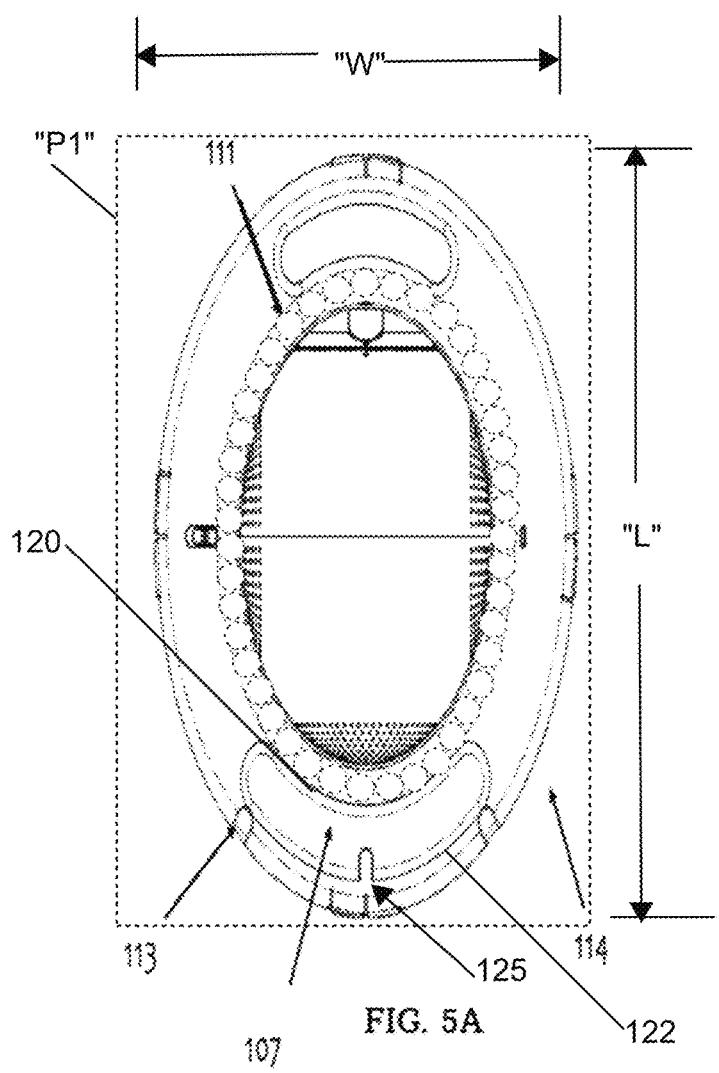
FIGS. 5A and 5B are top and a side views, respectively, of the rodent exercise system of FIG. 2.
Figure 5B:
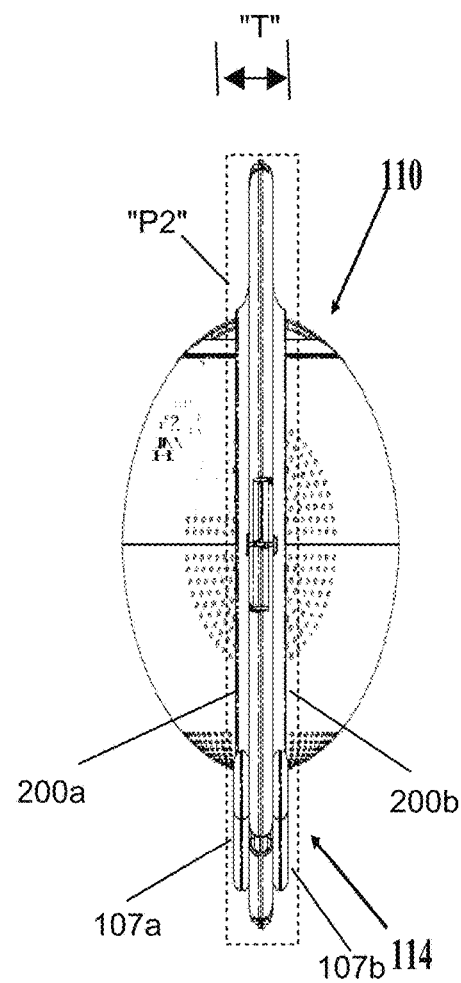

As shown in FIGS. 5A and 5B, the carrier 101 is configured to store a pair of detachable legs 107 (a first leg 107a and a second leg 107b) with arcuate shapes in a stored position when the legs 107 are not in use by virtue of a mechanical coupling between one or more leg engagement elements 302 (see FIG. 6B) of legs 107 and one or more carrier engagement elements 304 (see FIG. 6A) of carrier 100. The leg and/or carrier engagement elements 302, 304 can be any suitable mechanical features such as bores and/or protuberances that slide-fit into such bores for supporting legs 107 on respective first and/or second curvilinear faces 102a, 102b (see FIGS. 1, 5A and 5B). Each leg 107a, 107b includes a curved inner edge 120 and a curved outer edge 122 that has a greater radius than the curved inner edge 120. The curved inner edge 120 is connected to the curved outer edge 122 at a first end 124 and at a second end 126 that this opposed to the first end 124 as seen in FIG. 6B. The first and second ends 124, 126 are rounded.

The ring-shaped housing 102 includes an inner edge 202 and an outer edge 203. The inner edge 202 of the ring-shaped housing 102 defines a second or central aperture 204 designed to accommodate a rodent exercise apparatus 110, such as a hamster exercise ball. The inner edge 202 extends around an aperture axis "AA" (FIG. 1) along which the central aperture 204 extends. In aspects, the rodent exercise apparatus 110 may have a diameter between about 127 mm (5 inches) to about 330.2 mm (13 inches). The carrier 101 may be made from any number of polymer plastics.

Figures 7A, 7B:
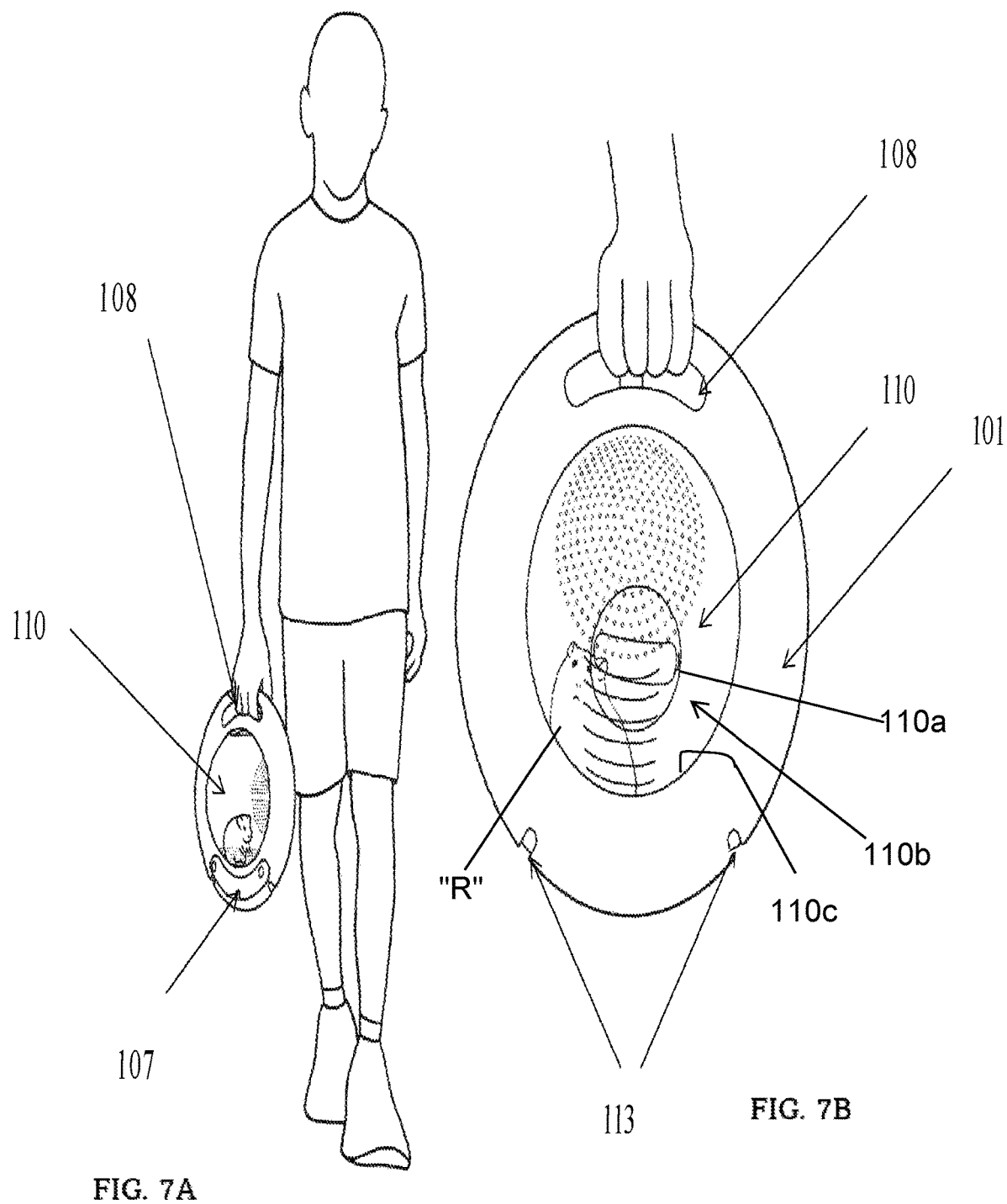
FIGS. 7A and 7B are progressive views illustrating a user carrying the rodent exercise system.

FIG. 2 illustrates the carrier 101 and an accompanying pet (e.g. rodent) exercise apparatus referred to generally as a rodent exercise apparatus 110 having a selectively openable access door 110a for allowing a small animal or pet, referred generally herein as a rodent "R", to access to an internal cavity 110b defined by an inner surface 110c of the rodent exercise apparatus 110 (see FIG. 7B). Such rodents "R", as used herein, can include, for example, hamsters, gerbils, sugar gliders, hedge hogs, mice and rats. Notably, small animals such as hedge hogs are not typically characterized as rodents; however, in the interest of brevity, such small animals are characterized herein as rodents. The carrier 101 is designed to accept a rodent exercise apparatus 110 which can then rotate 360 degrees on a single axis defined by two pivot pins including a retractable pivot pin 104 and a fixed pivot pin 105. The rodent exercise apparatus 110 may be releasably coupled to the carrier 101 via fixed pivot pin 105. First, a user may insert the rodent exercise apparatus into the central aperture 204 by aligning the fixed pivot pin 105 adjacent a recess 106 defined in rodent exercise apparatus 110 while sliding a slide latch 103 in a first direction, causing the retractable pivot pin 105 to retract from a first position (e.g., a retracted position) to a second position (e.g., an extended position), creating sufficient space for the rodent exercise apparatus 110 inside the second aperture 204. Next, the user may release the slide latch 103, causing the retracing pivot pin 105 to extend into the recess 106, extending from the second position back to the first position and coupling rodent exercise apparatus 110 to carrier 101. The user may release the rodent exercise apparatus 110 from the carrier 101 by subsequently sliding the slide latch 103, causing the retractable pivot pin 105 to retract from the recess 106, retracting from the first position to the second position.

Figure 4:
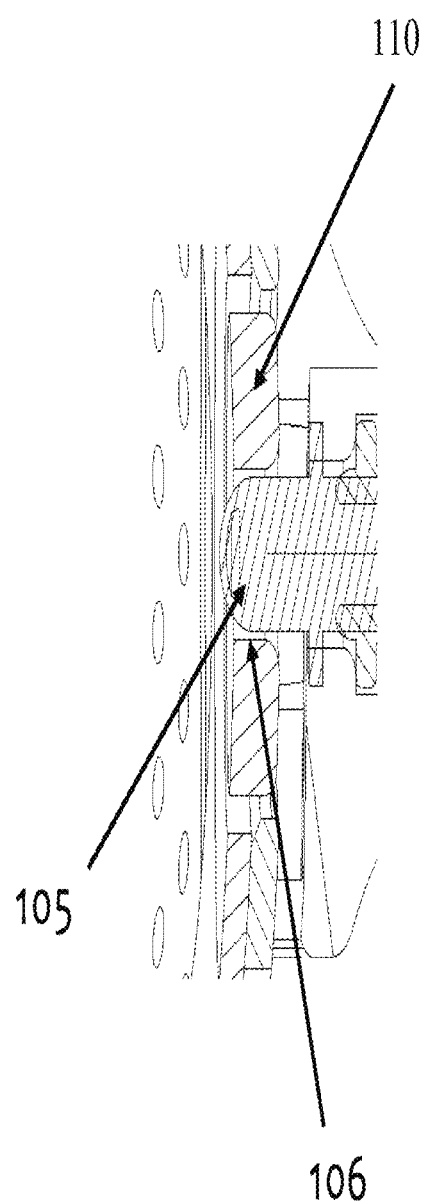
FIG. 4 is an enlarged, cross-sectional view of portions of the rodent exercise system of FIG. 2 and illustrating a fixed pin of the carrier of FIG. 1.

FIGS. 3 and 4 illustrate the retractable pin mechanism 112 and the fixed pivot pin 105. The retractable pivot pin 104 uses a spring mechanism 109 to bias the retractable pin 112 in the first position. The slide latch 103 is connected to the retractable pin 112. The slide latch 103 allows the user to retract the retractable pin 112 during installation of the exercise pall 110. In aspects, the exercise ball may attach to the ring 102 through retractable inserts that enable the rodent exercise apparatus 110 to rotate 360 degrees in a single direction. In aspects, legs 107 may enable omnidirectional spin of the rodent exercise apparatus 110 while the carrier 101 stands upright and stationary on a surface 116 while coupled to the legs 107. Hinges (not shown) may allow for easy insertion and removal of the rodent exercise apparatus 110 from carrier 101.

FIGS. 5A and 5B illustrate the carrier 101 used in the transport configuration 114. During the transport configuration 114, the legs 107 may be stowed on the surface 200 of ring 102 and the exercise ball 110 may be coupled to the carrier. In embodiment aspects, the inner edge 202 of the ring is lined with ball bearings 111, which enable omnidirectional spin of the rodent exercise apparatus 110. Generally, ball bearings 111 enable free spinning of the rodent exercise apparatus 110 relative to the carrier 101. When the carrier 101 and the rodent exercise apparatus 110 are uncoupled and placed on ground, the rodent exercise apparatus 110 can spin 360 degrees along an outer circumference 206 of the carrier 101.

FIGS. 6A and 6B illustrate the carrier 101 used in the stationary exercise configuration 115. In this configuration, the legs 107 are coupled to the carrier 101 by a notch 125 defined in curved outer edges 122 of legs 107 that engage respective recesses (e.g., leg retaining features) 113 defined in the outer edge 203 of ring-shaped housing 102 at spaced-apart locations on a lower portion of ring-shaped housing 102 to support the carrier 101 in an upright position when supported on surface 116. In this arrangement, the carrier 101 remains stationary on the surface 116 so that the rodent exercise apparatus 110 can freely spin 360 degrees about a central axis "C" defined through the rodent exercise apparatus 110 while the rodent exercise apparatus 110 is affixed to the carrier 101.

As seen in FIG. 6A, the rodent exercise apparatus 110 includes three discrete sections of annular rows of uniformly spaced apart rounded ventilation apertures 1110. The three discrete sections include a first section 1102 encircling the central axis "C" on a first side of the rodent exercise apparatus 110, a second section 1104 encircling the central axis "C" on a second side of the rodent exercise apparatus 110 opposite to the first section 1102, and a third section 1106 that encircles an axis "D" orthogonal to the central axis "C".

FIGS. 7A and 7B illustrate the carrier 101 in use for transportation of a rodent, with rodent exercise apparatus 110 selectively or releasably coupled to carrier 101. During transportation, the rodent is capable of rotating within the rodent exercise apparatus 360 degrees about central axis "C".

Insofar as the description above and the accompanying drawings disclose any additional subject matter that is not within the scope of the claims below, the disclosures herein are not dedicated to the public and the right to file one or more applications to claim such additional inventions is reserved.

Persons skilled in the art will understand that the structures and methods specifically described herein and shown in the accompanying figures are non-limiting exemplary aspects, and that the description, disclosure, and figures should be construed merely as exemplary of aspects. It is to be understood, therefore, that the present disclosure is not limited to the precise aspects described, and that various other changes and modifications may be effected by one skilled in the art without departing from the scope or spirit of the disclosure. Additionally, the elements and features shown or described in connection with certain aspects may be combined with the elements and features of certain other aspects without departing from the scope of the present disclosure, and that such modifications and variations are also included within the scope of this disclosure. Accordingly, the subject matter of this disclosure is not limited by what has been particularly shown and described.

What is claimed is:

1. A rodent exercise system comprising:
    a rodent exercise ball defining a cavity bounded by an inner surface and including an access door on an outer surface, the access door being selectively openable to enable a rodent to enter the cavity;

a ring-shaped housing having a length, a width, and a thickness, the ring-shaped housing including:

an inner edge and an outer edge;

a central aperture defined by the inner edge and aligned along the aperture axis, the central aperture configured to receive and rotatably support the rodent exercise ball such that the rodent exercise ball rotates relative to the ring-shaped housing in response to movement of the rodent within the cavity, wherein the ring-shaped housing defines a first plane extending along the width of the ring-shaped housing and transverse to the aperture axis, and a second plane extending along the thickness of the ring-shaped housing and along the aperture axis, the second plane being transverse to the first plane;

and at least one leg extending from a first end to a second end, the at least one leg being selectively attachable to the ring-shaped housing in a stored position and alternatively attachable to the ring-shaped housing in a standing position, wherein, in the stored position, the at least one leg extends along a direction that lies in the first plane, and wherein, in the standing position, the at least one leg extends along a direction that lies in the second plane, the second direction being transverse to the first direction, and wherein the first end and the second end of the at least one leg are configured to rest on a surface to support the ring-shaped housing in an upright orientation.

2. The rodent exercise system of claim 1, wherein the central aperture has a diameter ranging from about 127 mm (5 inches) to about 330.2 mm (13 inches).

3. The rodent exercise system of claim 1, wherein the ring-shaped housing includes a first pin extending into the central aperture and a second pin extending into the central aperture in diametrically opposed relationship with the first pin, the first and second pins configured to cooperate with the rodent exercise ball to enable to the rodent exercise ball to be selectively attached to and detached from the ring-shaped housing.

4. The rodent exercise system of claim 3, wherein the at least one of the first or second pins is retractable out of the central aperture and into the ring-shaped housing.

5. The rodent exercise system of claim 3, wherein the first pin is spring biased.

6. The rodent exercise system of claim 5, wherein the first pin is operatively coupled to an actuator.

7. The rodent exercise system of claim 1, wherein the ring shaped housing includes a handle to enable the ring-shaped housing to be carried.

8. The rodent exercise system of claim 1, wherein the ring-shaped housing defines at least one recess in the outer edge of the ring-shaped housing that is configured to receive the at least one leg.

9. The rodent exercise system of claim 1, wherein the ring-shaped housing includes a curvilinear body that extends between the inner and outer edges, wherein the curvilinear body has a first curvilinear face on one side of the curvilinear body and a second curvilinear face on another side of the curvilinear body, wherein the central aperture extends through the ring-shaped housing from the first curvilinear face to the second curvilinear face.

10. The rodent exercise system of claim 9, wherein the at least one leg includes a first leg and a second leg, wherein when the first and second legs are disposed in stored positions, the first leg is configured to mechanically couple to the first curvilinear face and the second leg is configured to mechanically couple to the second curvilinear face.

11. The rodent exercise system of claim 10, wherein the first and second legs have arcuate shapes.

12. The rodent exercise system of claim 1, wherein the at least one leg includes a curved inner edge and a curved outer edge that has a greater radius than the curved inner edge.

13. The rodent exercise system of claim 12, wherein the curved inner edge and the curved outer edge are disposed in the same plane, and wherein the first and second ends of the at least one leg connect the curved inner edge to the curved outer edge.

14. The rodent exercise system of claim 13, wherein the first and second ends are rounded.

15. The rodent exercise system of claim 12, wherein in the stored position, the curved inner edge of the at least one leg is radially closer to the central aperture than the curved outer edge, and wherein in the standing position, the curved outer edge of the at least one leg is radially closer to the central aperture than the curved inner edge.

16. The rodent exercise system of claim 1, wherein the rodent exercise ball includes a plurality of ventilation apertures.

17. The rodent exercise system of claim 16, wherein the plurality of ventilation apertures includes at least three discrete sections of annular rows of rounded ventilation apertures including a first section encircling a central axis of the rodent exercise ball on a first side of the rodent exercise ball, a second section encircling the central axis of the rodent exercise ball on a second side of the rodent exercise ball opposite to the first section, and a third section that encircles an axis of the rodent exercise ball orthogonal to the central axis of the rodent exercise ball.

18. The rodent exercise system of claim 1, wherein the at least one leg or the ring-shaped housing includes at least one protuberance and the other of the at least one leg or the ring-shaped housing defines at least one bore that is engageable with the at least one protuberance to support the at least one leg in the stored position.

* * * * *